United States Patent [19]

Daane

[11] 4,197,972
[45] Apr. 15, 1980

[54] CONTACTLESS TURNING GUIDE HAVING AIR SLOTS LONGITUDINALLY ALONG RUNNING WEB EDGES

[75] Inventor: Robert A. Daane, Green Bay, Wis.

[73] Assignee: W. R. Grace & Co., New York, N.Y.

[21] Appl. No.: 937,468

[22] Filed: Aug. 28, 1978

[51] Int. Cl.² .................................................. B65H 17/32
[52] U.S. Cl. ......................................... 226/97; 34/156; 226/197
[58] Field of Search ............................. 226/97, 7, 197; 242/57.1; 134/64 P, 122 P; 34/156

[56] References Cited

U.S. PATENT DOCUMENTS

| | | | |
|---|---|---|---|
| 2,689,196 | 9/1954 | Daniels | 226/97 |
| 3,186,326 | 6/1965 | Schmidt | 226/97 X |
| 3,395,943 | 8/1968 | Wilde | 226/97 |
| 3,567,093 | 3/1971 | Johnson | 226/97 |
| 4,131,320 | 12/1978 | Volat | 226/97 |

Primary Examiner—Edward J. McCarthy
Attorney, Agent, or Firm—James E. Nilles

[57] ABSTRACT

A guide for contactless support of a running web as the latter changes directions. The guide is formed as a drum-like member having an arcuately curved surface which can be variable as to the length of its arc depending on the degree of turn or change of direction desired for the running web. A pair of circumferentially spaced air nozzles extend along the length of the drum-like member and transversely across the web and pressurized air is fed through the nozzles so as to form a pneumatic cushion between the web and the arcuate surface of the drum-like member to thereby float the web in its turning direction over the drum-like member and without contact therewith. The invention includes a pair of air nozzles, one extending along each side edge of the running web and located outside the width of the web and which not only retard or eliminate leakage of air from the supporting air cushion out from under the longitudinal edges of the web, but also act on the web to eliminate side drift or lateral tracking instability of the web.

10 Claims, 11 Drawing Figures

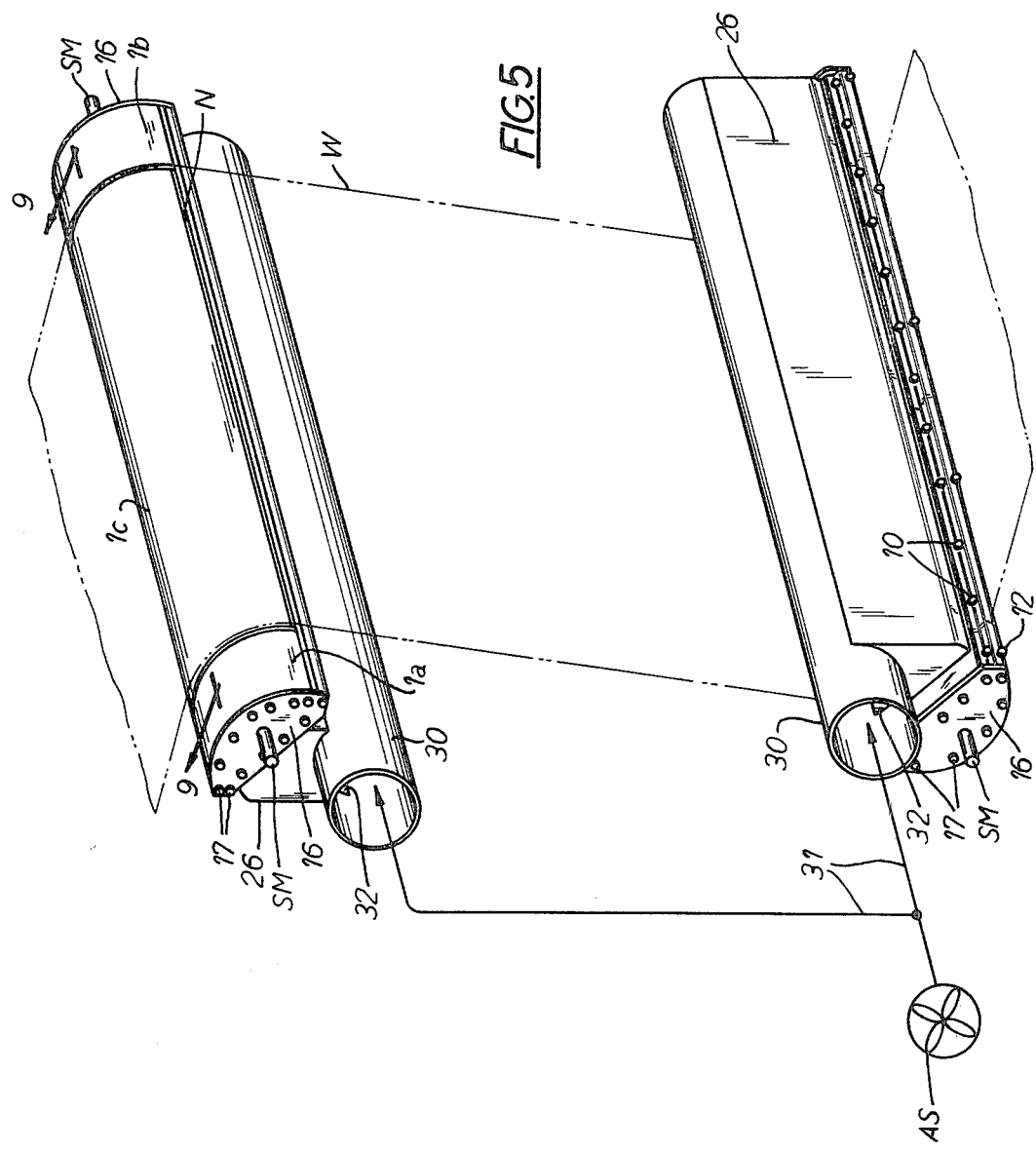
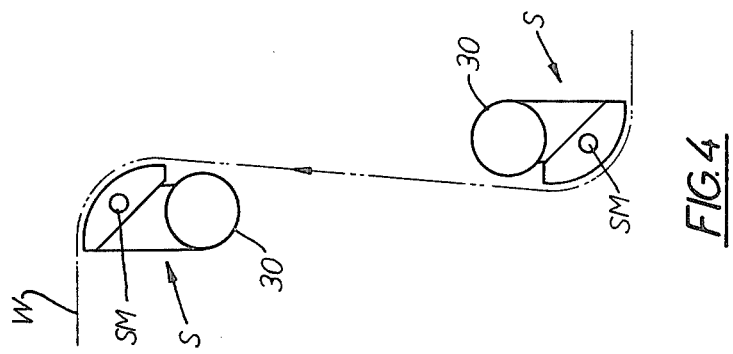

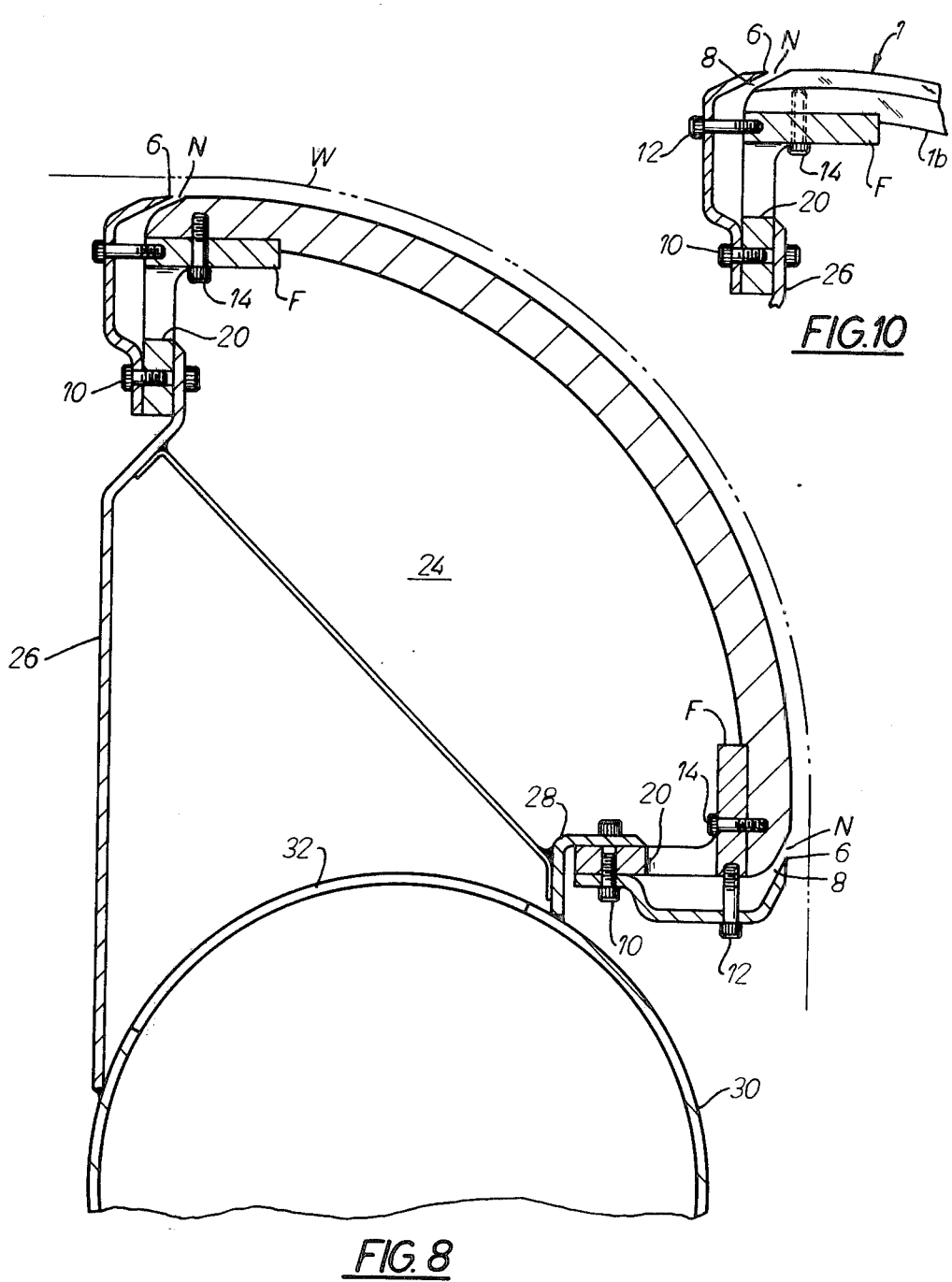
FIG. 10
FIG. 8
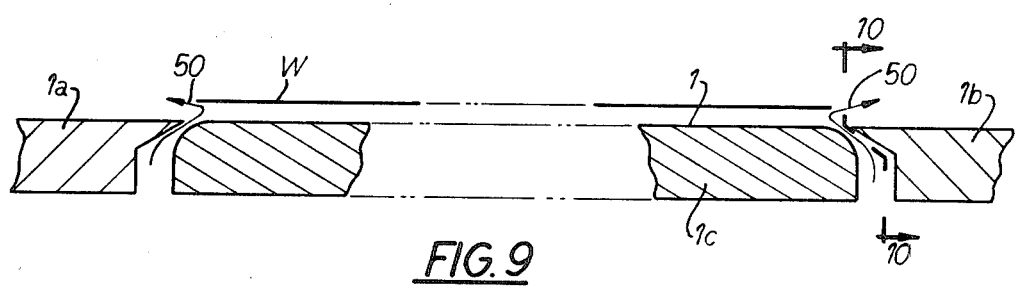
FIG. 9

CONTACTLESS TURNING GUIDE HAVING AIR SLOTS LONGITUDINALLY ALONG RUNNING WEB EDGES

BACKGROUND OF THE INVENTION

Various devices for forming fluid cushions or fluid bearings have been proposed for the contactless support of a web as the latter changes directions during its course of travel. These webs may have printed matter on both sides and which must be dried without contact of the web by any supporting rollers or the like. These running webs to be dried must pass through a number of runs of different directions and the web must be held out of contact with anything until the ink has dried. These contactless supporting devices have a generally partially cylindrical surface through which pressurized air is introduced through various slots, holes, or apertures, or other designs or patterns.

Examples of such prior art devices are shown in the Daniels U.S. Pat. No. 2,689,196 which issued Sept. 14, 1954 wherein a series of holes are simply formed in the cylindrical surface for the passage of pressurized air therethrough to support and guide a web passing over the drum. Another example is shown in the U.S. Pat. No. 3,097,971 to Carlisle which issued July 16, 1963 and which has a series of slits in the curved supporting surface and which extend either longitudinally or transversely to the web, or both. Air under pressure is then passed through these slits to form a cushion between the drum and the web. Still another example is shown in the U.S. Pat. No. 3,567,093 which issued Mar. 2, 1971 to Johnson and wherein a series of holes is formed in the drum-like supporting member and a series of arcuate baffle members extend around a portion of the drum and in the direction of web movement. Still other examples of the prior art are shown in U.S. Pat. No. 3,127,080 issued Mar. 31, 1964 to Allander et al and U.S. Pat. No. 3,186,326 which issued June 1, 1965 to Schmidt and in both of the latter patents, air is passed through slots or holes in the cylindrical members to form a pressurized cushion between the cylindrical member and the web.

One shortcoming of the prior art devices, particularly that as shown in the said Carlisle U.S. Pat. No. 3,097,971, is that of lateral tracking instability or side drifting of the web. Furthermore, corrective pressure forces are difficult to obtain because of air slots which extend in the direction of web travel are located beneath the web to form the pressure cushion.

In certain prior art devices, other than the said Carlisle U.S. Pat. No. 3,097,971, a very large air flow rate is required to support a web under high tension with adequate clearance between the web and the support surface. In these other devices, the air in the pneumatic support cushion is relatively free to escape out from under the longitudinal edges of the web.

SUMMARY OF THE INVENTION

The present invention provides a contactless support for a running web having an arcuate surface and a pair of air slots is located transversely across the arcuate surface of the support and extend longitudinally of and adjacent each edge of the running web. These air slots are located outside the web width and not only act to trap the air in the web supporting pneumatic cushion, but also act to eliminate side drift or lateral tracking instability of the web. These particular longitudinally arranged slots give a symmetrical pressure profile across the width of the web and if the web does drift to one side it may produce a non-symmetrical corrective profile which produces a web guiding action in the lateral direction. A pair of air nozzles are provided and which extend longitudinally of the support member, that is transversely across the web, one such nozzle being located adjacent each of opposite ends of the parallel grooves. These air nozzles act to also supply pressurized air to the space between the web and the arcuate surface of the support member thereby supporting the web in a contactless manner by a pressurized cushion of air.

These and other objects and advantages of the present invention will appear hereinafter as this disclosure progresses, reference being had to the accompanying drawings.

FIG. 4 is a schematic, elevational view of a web being supported by a pair of contactless web turn supports made in accordance with the present invention, but on a reduced scale, and for use with both the modifications of the invention which are shown in FIGS. 1-3 and FIGS. 5-10;

FIG. 5 is a perspective view of a pair of contactless supports made in accordance with the present invention, the supports being a modification of that shown in FIGS. 1-3;

FIG. 8 is a transverse, sectional view through the support, the view being taken generally along the line 8—8 in FIG. 7;

FIG. 9 is a longitudinal, cross-sectional view taken through the support shown in FIG. 5, the view being taken along line 9—9 in FIG. 5, but on an enlarged scale; and FIG. 10 is a fragmentary view of a portion of the device shown in FIG. 8, but the view being taken through the edge air slot and generally along the line 10—10 of FIG. 9.

DESCRIPTION OF A PREFERRED EMBODIMENT

Figure 1:
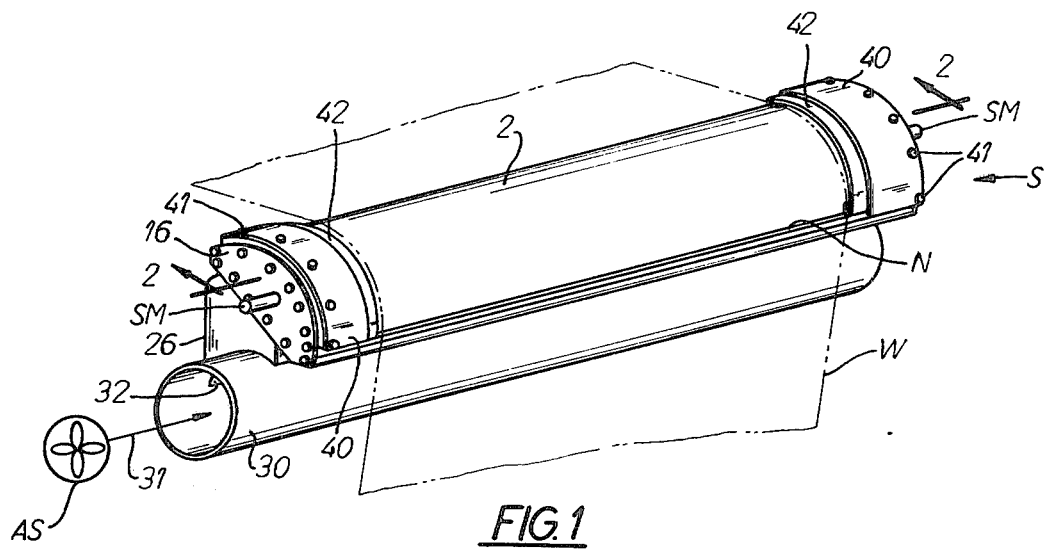
FIG. 1 is a perspective view of an air turn made in accordance with the present invention and showing certain parts removed for the sake of clarity.

The web support provided by the present invention can support a running web through various degrees of turning movement, but the present invention has been illustrated as showing a web support for an approximate 90 degree turn of the running web. Such a turning movement is shown in FIG. 1 wherein the web W passes over and without contact with the support S provided by the present invention.

Figure 7:
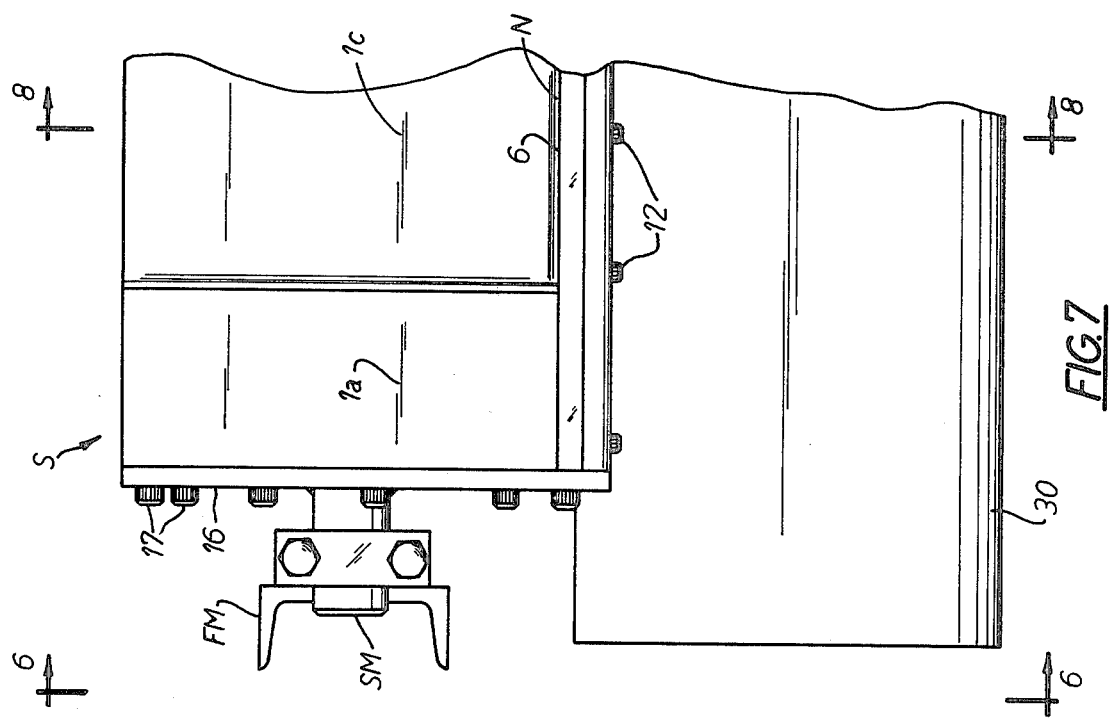
FIG. 7 is a fragmentary, elevational view of the support shown in FIG. 6, taken generally along the line 7—7 in FIG. 6.
Figure 6:
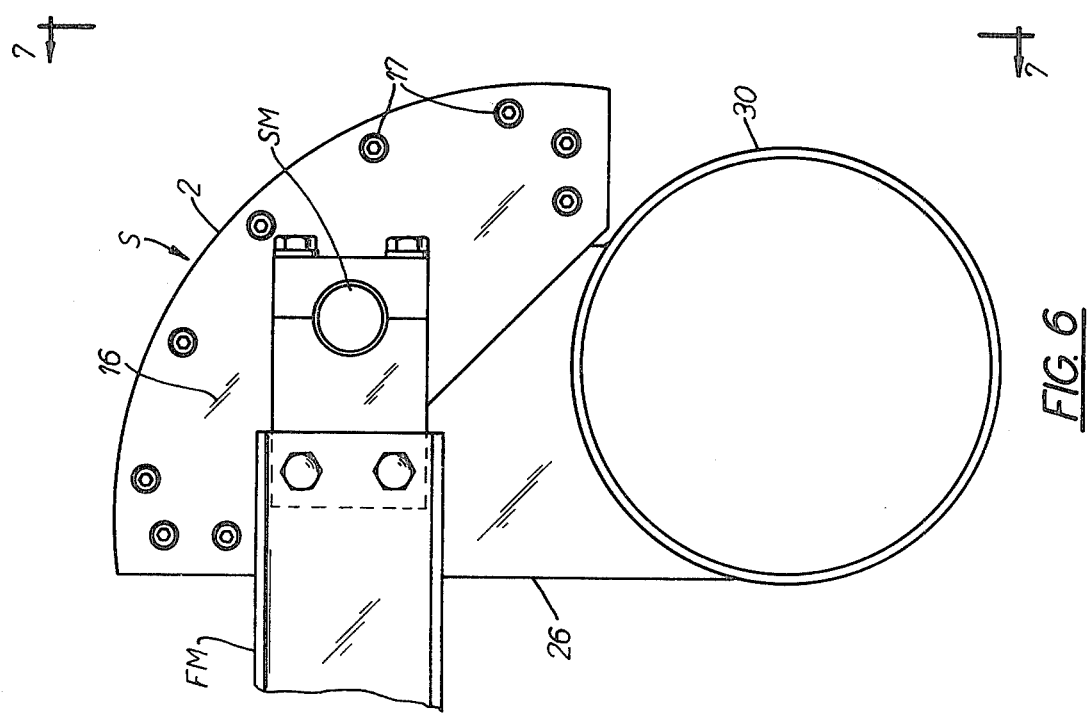
FIG. 6 is an end elevational view of one of the supports shown in FIG. 5, but on an enlarged scale, the view being taken generally along the line 6—6 in FIG. 7.

The two modifications of the invention shown in FIGS. 1-3 and FIGS. 5-10 have many similar parts which have been correspondingly numbered. Some of the supporting frame structure as shown in FIGS. 6 and 7 is equally applicable to the modification shown in FIGS. 1-3. FIG. 4 shows an arrangement of a plurality of air turn supports for either modification.

The support S includes an elongated, arcuate member 1 formed generally with a 90 degree arcuate surface 2 which extends across the width of the web W to be supported and preferably beyond the edges of the web. The support S has shaft means SM by which it is mounted in the machine frame FM.

In operation, the web W passes a distance away from the surface 2, for example on the order of 1/16" to ⅛". A transverse air nozzle N is located along each end of the surface 2 and these circumferentially spaced apart nozzles extend across the full width of the support S; namely, they extend transversely across the width of the web supported by the contactless support S. The nozzles are formed by a generally U-shaped piece of metal having a sharp nozzle edge 6 which is spaced a distance from the support 1 so as to define an elongated slot or nozzle 8 through which pressurized air is discharged. The nozzle N is held on the frame F of the support by a series of screws 10 at the rear end of the nozzle and also by adjustable screws 12 which are threadably engaged in the frame F and extend freely through the nozzle N so as to adjust the size of the nozzle opening 8. The arcuate support S is rigidly secured to the frame member F by the screws 14 which facilitate the manufacture and assembly of the various parts. Alternatively, the nozzle N and the frame F may be all one piece of metal, formed by extrusion, for example.

The support S includes end plates 16 secured by cap screws 17 to the ends of the arcuate member 1. Stub shaft means SM are welded to and extend from the end plates and are adjustably mounted in the frame means FM. The angular position of the support can thus be changed by adjustably rotating the support on its stub shafts.

The frame F has a series of holes 20 passing therethrough and through which pressurized air is fed from the chamber 24. Chamber 24 is also defined by sheet metal members 26 and 28 that in turn are welded to a central duct 30. Air under pressure is supplied to the end of the duct 30 by a supply conduit 31 from an air supply AS (FIG. 5). The duct 30 has a longitudinal opening 32 and in this manner, pressurized air passes from duct 30 and into the chamber 24, and is readily available for discharge through the nozzle N and to each of the circumferentially spaced apart, transverse ends of the arcuate surface 2.

A pair of air nozzles is provided along and outside of each of the longitudinal edges of the running web which passes over the arcuate surface 2. This pair of air nozzles extend longitudinally of the web and adjacent the edges thereof, but outside the lateral limits of the web, and serve to eliminate side drift of the web and prevent lateral tracking instability of the web. In other words, these air slots which extend longitudinally of the web act to guide the web and apply corrective forces to web side drift resulting in stable tracking of the web and non-fluttering thereof. This web guide action is such that it pushes the web back to its proper lateral position, and if there is a drift of the web to one side or the other, these slots produce a non-symmetrical corrective pressure profile. These air slots located adjacent and along the edges of the running web will now be referred to in detail.

FIGURES 1-3

Figure 2:
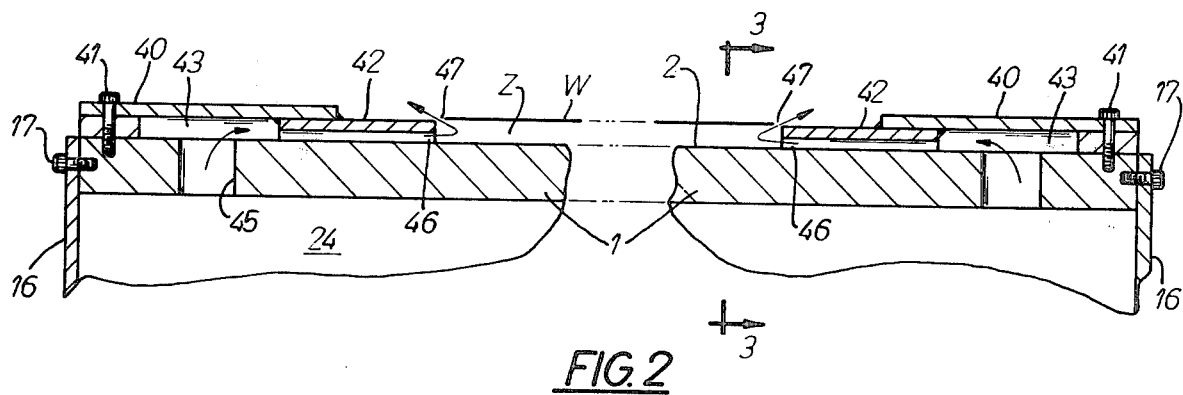
FIG. 2 is a longitudinal cross-sectional view through the air turn shown in FIG. 1 and taken generally along the line 2—2 in that figure.
Figure 3:
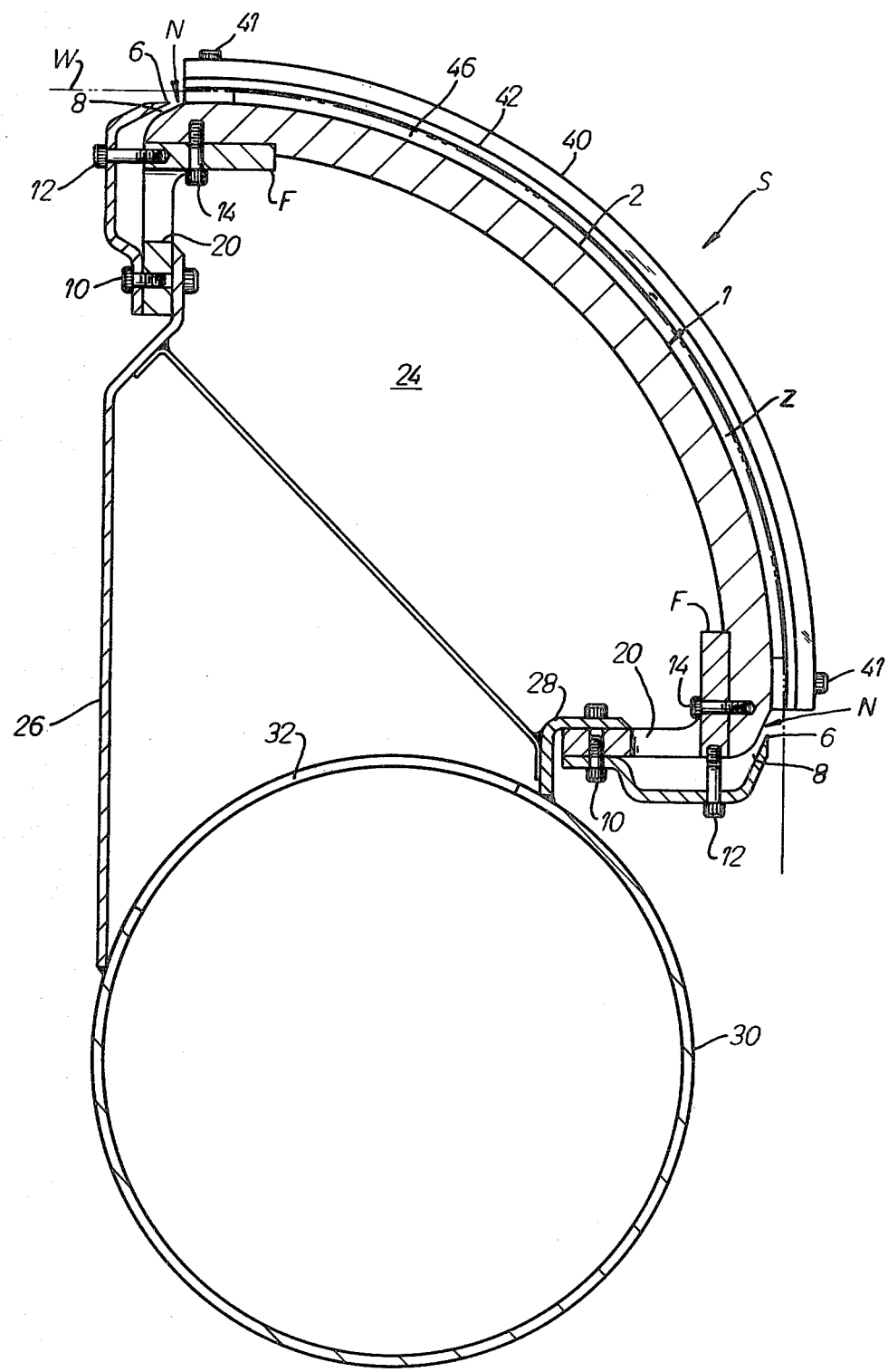
FIG. 3 is an enlarged, cross-sectional view taken through the air turns of FIGS. 1 and 2, the view being taken generally along the line 3—3 in FIG. 2.

Referring to the modification of the invention shown in FIGS. 1-3, a pair of curved shrouds 40 are secured by cap bolts 41 to the arcuate member 1, one such shroud being located adjacent each of the outer edges of the web. These shrouds may be of various transverse widths so as to accommodate various web widths or various positions of the web laterally on the air turn support. In this manner, considerable flexibility of use of the present invention is possible. Another curved shroud member 42 is welded or otherwise secured inwardly of, i.e., to the underside of shroud 40, is concentric therewith and extends laterally inwardly of the outer shroud 40 to define a plenum space 43 into which pressurized air is introduced from chamber 24 via openings 45.

The inner shroud 42 is spaced above the curved surface 2 of member 1, preferably a distance on the order of .030" to 0.100' thereby forming a curved, annular air nozzle slot 46 adjacent the edges 47 of the web through which the pressurized air is forced from space 43. As indicated by the curvilinear arrow in FIG. 2, the air being discharged through the nozzle slot 46 enters the air cushion zone Z between the web and the arcuate surface of member 1 and is then forced to turn upon itself and exit into the atmosphere as indicated. This action occurs at each longitudinal edge of the web and together with the transverse nozzles N causes the web to ride a distance above the cylindrical surface 1 of about 1/16" to ⅛". This space of course can vary, for example if there were a larger slot opening, the web clearance would be greater. The action of the two longitudinal slots, which are not located beneath the web, but rather to each side of it, is such that side drift of the web or lateral tracking instability is eliminated, because these slots give symmetrical pressure profiles across the width of the running web. Furthermore, if there is a drift of the web to one side, the longitudinal slots provide a non-symmetrical corrective profile thus assuring proper positioning of the web in a transverse direction.

Figure 2A:
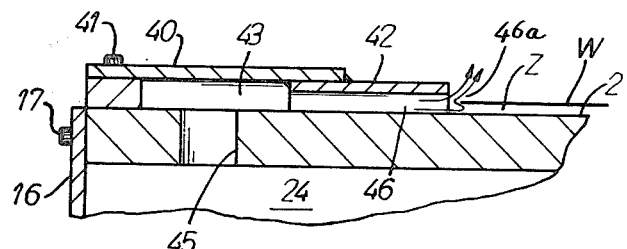
FIG. 2a is a fragmentary view showing a portion of the guide shown in FIG. 2, but showing the air slot nozzle located above the level of the web.

As shown in FIG. 2a, the nozzle slot 46a is larger and can extend above the web in which case a portion of the air emitted by the nozzle will be directly discharged above the web. This is not a preferred situation, but the wall jets aimed at the web edges may be slightly thicker than the space between the web and the cylindrical support surface without causing flutter.

FIGURES 5-10

The modification shown in FIGS. 5-10 also provide a pair of longitudinally extending nozzle slots along each longitudinal edge of the web and at the sides thereof but these nozzle slots are formed in the surface of the curved support member 1, as clearly shown in FIG. 9. In this case, the curved member 1 is made up of three parts, 1a, 1b, and 1c, the member 1b also being shown clearly in FIG. 10 and attached to the framework of the machine by cap screws, as are members 1a and 1c. In this embodiment, the curved corners of member 1b and which form a portion of the nozzle slot, are on the order of a ratio of ¼" to ⅜" and provide a Coanda effect for the nozzle as shown in the U.S. Pat. No. 3,549,070 to Frost et al, which issued Dec. 22, 1970 and entitled "Floatation of Sheet Materials" and which patent has been assigned to an assignee common with the present invention. In this modification also, these slots which extend longitudinally of the web are out from under the web edges. It has been found that these slots may be as much as ⅝" away from the web edge and still render the web stable and non-fluttering and the direction of air as it leaves the slots is shown by the curvilinear arrow 50 in FIG. 9.

I claim:

1. A contactless web support having an elongated arcuate surface and over which a running web is floatingly supported without contact therewith, a pair of elongated nozzles extending along the length of said elongated arcuate surface and circumferentially spaced apart from one another, said nozzles having discharge slots directed toward one another and over said arcuate surface to thereby form a web support fluid pressure zone between said arcuate surface and the web passing thereover, a pair of air slots on said support and extending transversely of said support and in the direction of web movement, one of said slots being located adjacent each of the side edges of said running web and outwardly thereof so as to direct pressurized air toward said web to thereby trap the air in said web support fluid pressure zone and to prevent lateral drifting of said web on said support and providing a lateral guiding action therefor, and means for supplying pressurized air to said nozzles and said slots.

2. The support set forth in claim 1 including shroud means secured above said arcuate surface and at each side of said web and forming said air slots with said arcuate surface and for directing pressurized air inwardly towards said web whereby at least a portion of said air is directed between said web and said arcuate surface.

3. The support set forth in claim 2 further characterized in that said shrouds are removably secured to said support whereby shrouds of various lengths can be utilized.

4. The support set forth in claim 1 further characterized in that said air slots are formed as passages in said arcuate surface and are located outwardly of said web for directing pressurized air into the space between said web and said arcuate surface.

5. The support set forth in claim 4 further characterized in that said slot is formed with an inner curved surface adjacent the longitudinal edges of said web to provide a Coanda effect to air discharged by said slot.

6. A contactless web support having an arcuate surface over which a running web is floatingly supported without contact therewith, a pair of air slots on said support and extending transversely of said support and in the direction of web movement, one of said slots being located adjacent each of the side edges of said running web and outwardly thereof so as to direct pressurized air toward said web to thereby prevent lateral drifting of said web on said support and providing a lateral guiding action therefor, and means for supplying pressurized air to said slots to form a pressurized air cushion between said web and said arcuate surface, said slots also acting to trap air in said air cushion.

7. The support set forth in claim 6 including shroud means secured above said arcuate surface and at each side of said web and forming said air slots with said arcuate surface and for directing pressurized air inwardly towards said web whereby at least a portion of said air is directed between said web and said arcuate surface.

8. The support set forth in claim 7 further characterized in that said shrouds are removably secured to said support whereby shrouds of various lengths can be utilized.

9. The support set forth in claim 6 further characterized in that said air slots are formed as passages in said arcuate surface and are located outwardly of said web for directing pressurized air into the space between said web and said arcuate surface.

10. The support set forth in claim 9 further characterized in that said slots are each formed with an inner curved surface adjacent the respective longitudinal edge of said web to thereby provide a Coanda effect to air discharged by said slot.

* * * * *